US012619273B2

(12) United States Patent
Naseef et al.

(10) Patent No.: US 12,619,273 B2
(45) Date of Patent: May 5, 2026

(54) SIMPLIFIED CLOCKING AND INPUT/OUTPUT TIMING USING SINGLE DATA RATE LINK FOR MULTIPLE SYSTEM-ON-CHIP DEVICE

(71) Applicant: QUALCOMM Incorporated, San Diego, CA (US)

(72) Inventors: Syed Naseef, Hyderabad (IN); Lior Amarilio, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 18/747,843

(22) Filed: Jun. 19, 2024

(65) Prior Publication Data

US 2025/0390135 A1     Dec. 25, 2025

(51) Int. Cl.
*G06F 1/00* (2006.01)
*G06F 1/06* (2006.01)
*G06F 1/08* (2006.01)

(52) U.S. Cl.
CPC . *G06F 1/06* (2013.01); *G06F 1/08* (2013.01)

(58) Field of Classification Search
CPC ........................................................ G06F 1/06
USPC ........................................................ 713/500
See application file for complete search history.

(56) References Cited

U.S. PATENT DOCUMENTS 10,003,456 B2     6/2018    Wang et al.
10,713,199 B2     7/2020    Amarilio et al.

| 2006/0150005 | A1* | 7/2006 | Abe | G06F 11/2023 |
| | | | | 714/E11.063 |
| 2006/0161709 | A1* | 7/2006 | Davies | G06F 13/404 |
| | | | | 710/268 |
| 2014/0340527 | A1* | 11/2014 | Wu | H04N 21/43632 |
| | | | | 348/180 |
| 2016/0337741 | A1* | 11/2016 | Amarilio | H04R 3/005 |
| 2017/0063700 | A1 | 3/2017 | Wang et al. | |
| 2018/0038908 | A1* | 2/2018 | Reiss | G06F 11/3656 |
| 2018/0152779 | A1 | 5/2018 | Amarilio et al. | |
| 2018/0373659 | A1* | 12/2018 | Amarilio | G06F 1/12 |
| 2019/0065431 | A1* | 2/2019 | Amarilio | G06F 1/12 |

OTHER PUBLICATIONS

International Search Report and Written Opinion—PCT/US2025/026997—ISA/EPO—Jun. 20, 2025.

* cited by examiner

*Primary Examiner* — Volvick Derose
(74) *Attorney, Agent, or Firm* — Harrity & Harrity, LLP

(57)     ABSTRACT

In some aspects, an electronic device may include a first system-on-chip (SOC) to generate peripheral data and a single data rate (SDR) clock signal to transport to a second SOC connected to the first SOC by a SoundWire bridge having a single clock line. The electronic device may transport the peripheral data to the second SOC over the SoundWire bridge according to the SDR clock signal carried on the single clock line. For example, to transport the peripheral data to the second SOC over the SoundWire bridge, the first SOC may drive the peripheral data onto a data bus during one or more drive phases associated with the SDR clock signal, and the second SOC may sample the peripheral data from the data bus during one or more bus keeper phases associated with the SDR clock signal. Numerous other aspects are described.

20 Claims, 8 Drawing Sheets

200
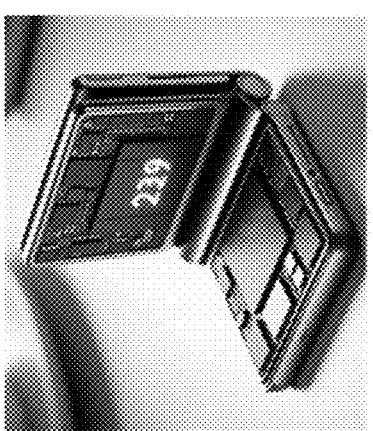
210-3
Foldable mobile device
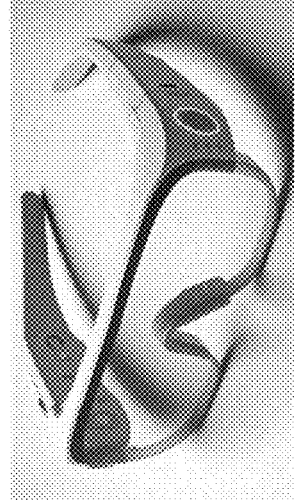
210-2
Foldable mobile device
210-1
Foldable AR/VR glasses
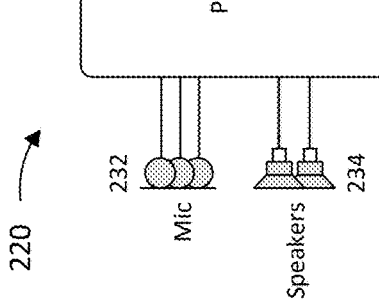
220
242   Mic
244   Speakers
Associate SOC
240
250   Hinge
Primary SOC
230
232   Mic
234   Speakers
FIG. 2

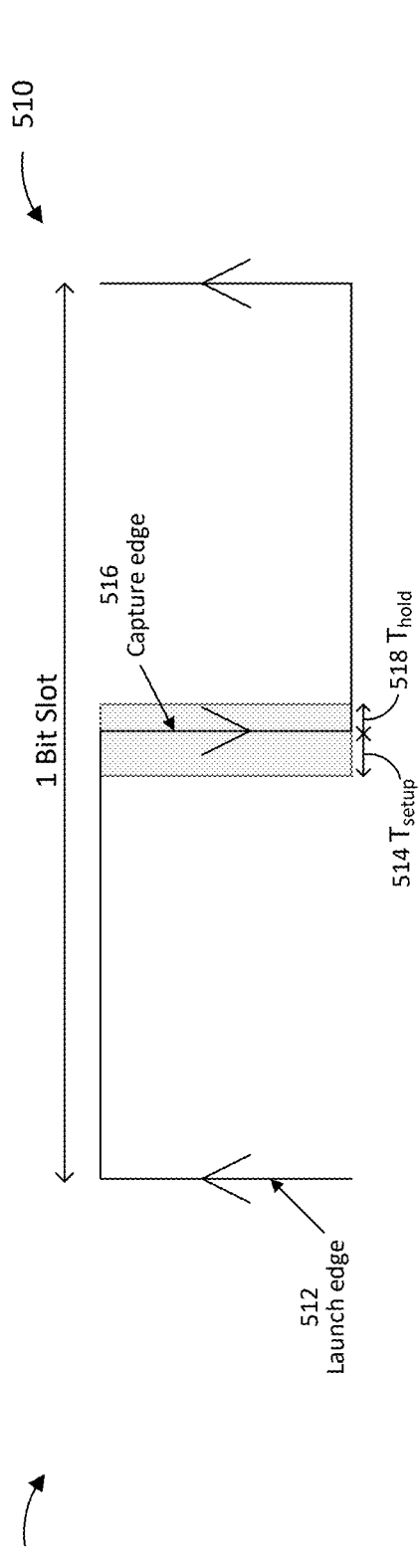
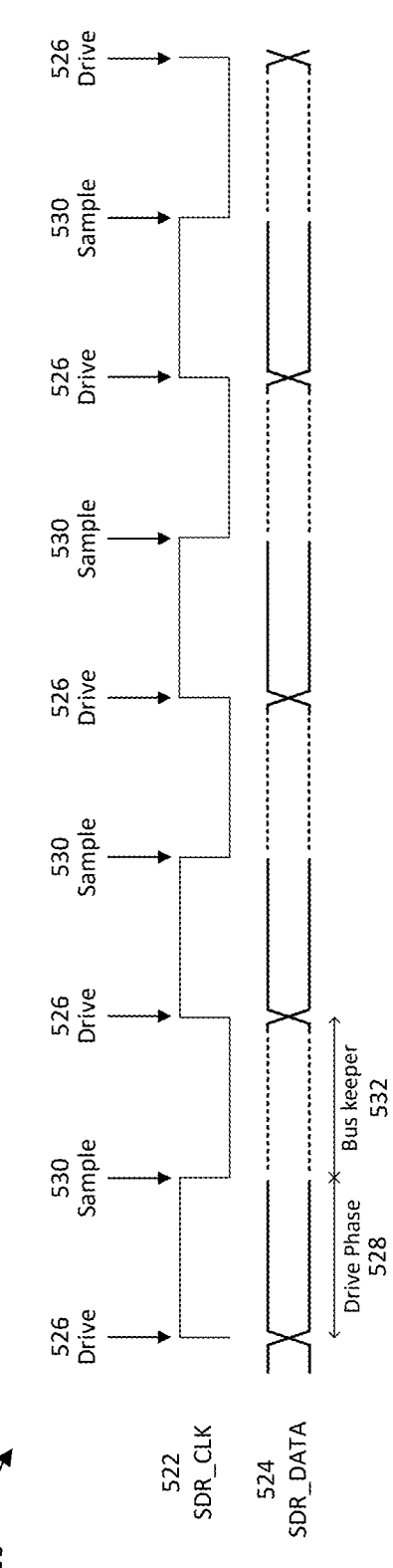
FIG. 5

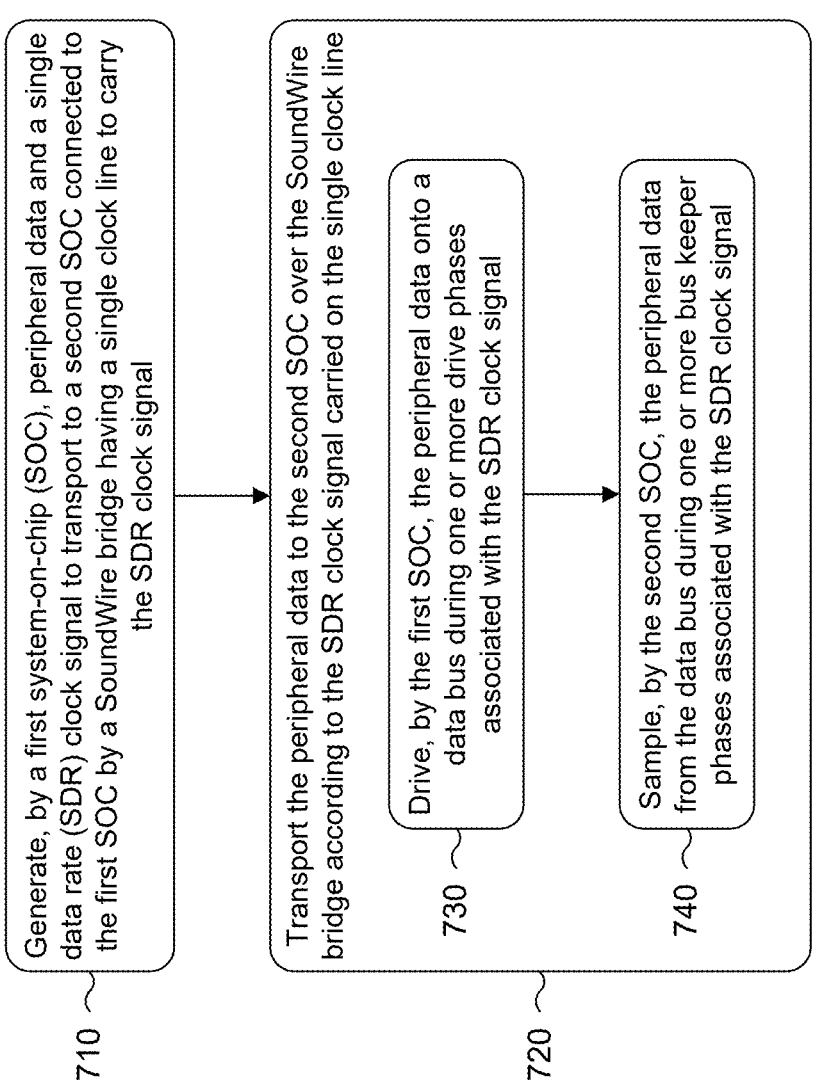

700

710   Generate, by a first system-on-chip (SOC), peripheral data and a single data rate (SDR) clock signal to transport to a second SOC connected to the first SOC by a SoundWire bridge having a single clock line to carry the SDR clock signal 720   Transport the peripheral data to the second SOC over the SoundWire bridge according to the SDR clock signal carried on the single clock line 730   Drive, by the first SOC, the peripheral data onto a data bus during one or more drive phases associated with the SDR clock signal 740   Sample, by the second SOC, the peripheral data from the data bus during one or more bus keeper phases associated with the SDR clock signal

FIG. 7

SIMPLIFIED CLOCKING AND INPUT/OUTPUT TIMING USING SINGLE DATA RATE LINK FOR MULTIPLE SYSTEM-ON-CHIP DEVICE

FIELD OF THE DISCLOSURE

Aspects of the present disclosure generally relate to bridging and specifically relate to techniques, apparatuses, and methods associated with simplified clocking and input/output timing using a single data rate link for a multiple system-on-chip device.

BACKGROUND

Electronic devices, including mobile communication devices, wearable computing devices such as smartwatches, and/or tablet computers support ever increasing functionalities and capabilities. Many electronic devices include peripheral devices, such as internal microphones and/or speakers, and may include connectors allow the peripheral devices to be used with audiovisual equipment including headphones and/or external speakers, among other examples. In some cases, communication among components of an electronic device may be provided through a digital interface defined by one or more standards, such as the SoundWire standard specified by the Mobile Industry Processor Interface (MIPI) Alliance. For example, the SoundWire standard defines a multi-wire communication bus to facilitate efficient and high-quality audio data transmission between different components within an electronic device. For example, SoundWire supports the transmission of high-resolution audio data to minimize loss of quality during transport, low power consumption that may be important for battery-powered devices, support for multiple channels and various data rates, precise timing and synchronization features to maintain audio quality and mitigate issues such as jitter or latency, and a simplified physical design that reduces the number of required pins and traces on circuit boards to replace older, bulkier interfaces.

SUMMARY

In some aspects, a method performed by an electronic device includes generating, by a first system-on-chip (SOC), peripheral data and a single data rate (SDR) clock signal to transport to a second SOC connected to the first SOC by a SoundWire bridge having a single clock line to carry the SDR clock signal; and transporting the peripheral data to the second SOC over the SoundWire bridge according to the SDR clock signal carried on the single clock line, wherein transporting the peripheral data to the second SOC over the SoundWire bridge includes: driving, by the first SOC, the peripheral data onto a data bus during one or more drive phases associated with the SDR clock signal; and sampling, by the second SOC, the peripheral data from the data bus during one or more bus keeper phases associated with the SDR clock signal.

In some aspects, an electronic device includes a first SOC; a second SOC; and a SoundWire bridge connecting the first SOC to the second SOC, wherein the SoundWire bridge has a single clock line, wherein: the first SOC is configured to generate peripheral data and an SDR clock signal to transport to the second SOC, the first SOC is configured to drive the peripheral data onto a data bus during one or more drive phases associated with the SDR clock signal, and the second SOC is configured to sample the peripheral data from the data bus during one or more bus keeper phases associated with the SDR clock signal.

In some implementations, an apparatus for wireless communication includes means for generating peripheral data and an SDR clock signal to transport over a SoundWire bridge having a single clock line; and means for transporting the peripheral data over the SoundWire bridge according to the SDR clock signal carried on the single clock line, wherein the means for transporting the peripheral data over the SoundWire bridge includes: means for driving the peripheral data onto a data bus during one or more drive phases associated with the SDR clock signal; and means for sampling the peripheral data from the data bus during one or more bus keeper phases associated with the SDR clock signal.

Aspects of the present disclosure may generally be implemented by or as a method, apparatus, system, computer program product, non-transitory computer-readable medium, user equipment, electronic device, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 2 is a diagram illustrating examples of multiple system-on-chip (SOC) electronic devices, in accordance with the present disclosure.

FIGS. 4-5 are diagrams illustrating examples associated with simplified clocking and input/output (I/O) timing using a single data rate (SDR) link for a multi-SOC electronic device, in accordance with the present disclosure.

FIG. 7 is a flowchart illustrating an example process performed, for example, by an electronic device, in accordance with the present disclosure.

DETAILED DESCRIPTION

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of data communication systems will now be presented with reference to various apparatus and methods. These apparatuses and methods will be described in the following detailed description and illustrated in the accompanying drawings by various blocks, modules, components, circuits, steps, processes, and/or algorithms (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element or combination of elements may be implemented in a "processing system" that includes one or more processors. Examples of processors include microprocessors, microcontrollers, digital signal processors (DSPs), field programmable gate arrays (FPGAs), programmable logic devices (PLDs), application specific integrated circuits (ASICs), a system-on-chip (SoC), state machines, gated logic, discrete hardware circuits, and other suitable hardware configured to perform the various functionality described throughout this disclosure.

Figure 1:
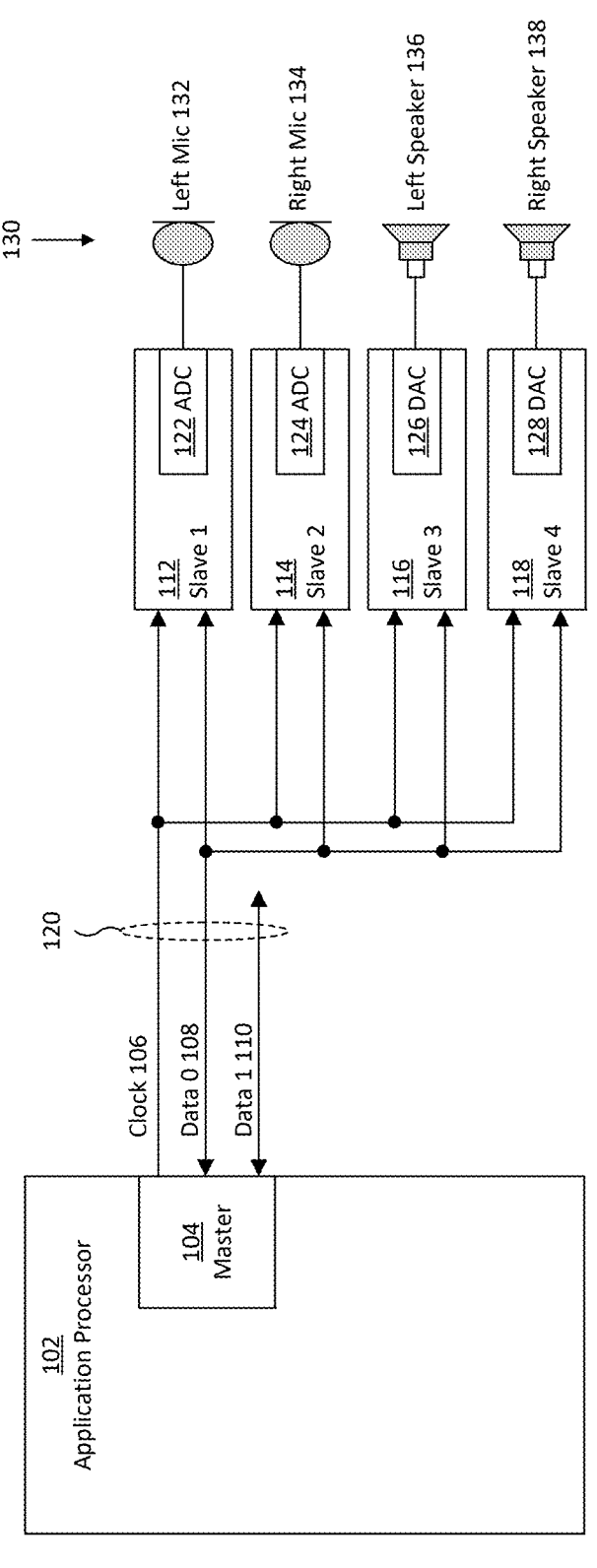
FIG. 1 is a diagram illustrating an example architecture for a SoundWire system, in accordance with the present disclosure.

FIG. 1 is a diagram illustrating an example architecture 100 for a SoundWire system, in accordance with the present disclosure. As described herein, various devices may be connected to a SoundWire bus, such as an audio headset, a coder-decoder (codec), an amplifier, a repeater, a switch, a bridge, and/or a signal processing devices, among other examples. In some aspects, a system clock at 32 kilohertz (kHz) may be distributed with minimal command and control. In the example architecture 100 shown in FIG. 1, an application processor 102, or other integrated circuit (IC) device, may include a codec or be configured to operate as a codec, and may be configured to communicate through a physical interface operated as a SoundWire bus master 104. The SoundWire bus master 104 may include one or more lane drivers and receivers, SoundWire encoders and/or decoders, state machines, sequencers, and/or logic circuits, among other examples. In some cases, the SoundWire bus master 104 may be implemented in a codec. The lane drivers and/or receivers of the SoundWire bus master 104 may be coupled to the wires of a multi-wire bus 120 through one or more terminals (e.g., input/output (I/O) pads) of the application processor 102.

In some aspects, the application processor 102 may communicate with one or more slave devices via the SoundWire bus master 104. For example, in the architecture 100 shown in FIG. 1, the application processor 102 may communicates with four slave devices 112, 114, 116, 118 that are associated with peripheral devices 130 (e.g., audio I/O devices). In some aspects, as shown in FIG. 1, a first slave device 112 may include an analog-to-digital convertor (ADC) 122 configured to digitize input received from a left-side microphone 132, a second slave device 114 may include an ADC 124 configured to digitize input received from a right-side microphone 134, a third slave device 116 may include a digital-to-analog convertor (DAC) 126 configured to provide an output to drive a left-side speaker 136, and a fourth slave device 118 may include a DAC 128 configured to provide an output to drive a right-side speaker 138.

In the example architecture 100 shown in FIG. 1, the application processor 102 may be coupled to the slave devices 112, 114, 116, 118 through the multi-wire bus 120. The multi-wire bus 120 may be configured to provide a clock line 106 and one or more data lines 108, 110. In general, the multi-wire bus 120 may support up to eight data lines 108, 110 on corresponding wires of the multi-wire bus 120. The SoundWire specification defines a fixed frame that may be transmitted over multiple data lines. In practice, each data line 108, 110 is assigned to one of the physical wires of the multi-wire bus 120. The frame can have rows and columns, where each row may include one or more bit slots that may be allocated to respective sources. The allocation of each bit slot may be changed from one source to any other source. The multi-wire bus 120 may be configured by the SoundWire bus master 104. The SoundWire bus master 104 may control data transport on up to eight data lines 108, 110 of the multi-wire bus 120.

As indicated above, FIG. 1 is provided as an example. Other examples may differ from what is described with respect to FIG. 1.

FIG. 2 is a diagram illustrating examples 200 of multiple SOC electronic devices, in accordance with the present disclosure. More particularly, as described herein, certain electronic devices may have multiple SOCs located in different places due to a form factor that imposes physical constraints on where components can be located. For example, FIG. 2 illustrates various foldable electronic devices, including augmented reality (AR) or virtual reality (VR) glasses 210-1, a foldable mobile device 210-2 (shown in an X-ray image), and a foldable mobile device 210-3. As shown by reference number 220, due to the physical limitations imposed by a hinge 250 in a foldable electronic device, a primary SOC 230 may be located on one side of the hinge 250 to control peripheral devices such as one or more microphones 232 and/or speakers 234 on the same side of the hinge 250, and an associate SOC 240 may be located on the other side of the hinge 250 to control peripheral devices such as one or more microphones 242 and/or speakers 244 on the same side of the hinge 250 as the associate SOC 240 (e.g., the opposite side of the primary SOC 230). In general, the primary SOC 230 may be configured to generate high-fidelity audio, control, sensor, and/or other peripheral data to control the peripheral devices on either side of the hinge 250.

The audio, control, sensor, and/or other peripheral data may need to be transported from the primary SOC 230 to the associate SOC 240 in order to control the microphones 242, speakers 244, and/or other peripherals connected to the associate SOC 240. However, in some cases, the form factor of an electronic device may pose challenges with respect to transporting the audio, control, sensor, and/or other peripheral data from the primary SOC 230 to the associate SOC 240. For example, in a foldable electronic device, the interface between the primary SOC 230 and the associate SOC 240 needs to support a high bandwidth to provide satisfactory performance and minimal wiring to withstand the physical interface challenges imposed by the hinge 250. Accordingly, some aspects described herein relate to techniques for using a SoundWire bridge to transport audio, control, and other peripheral data between a primary SOC 230 and an associate SOC 240. Furthermore, some aspects described herein relate to a SoundWire interface that has a single clock line, such that a single data rate (SDR) clock signal can be used to minimize the number of clock sources or I/O pads that are used to connect the primary SOC 230 and the associate SOC 240.

As indicated above, FIG. 2 is provided as an example. Other examples may differ from what is described with respect to FIG. 2.

Figure 3:
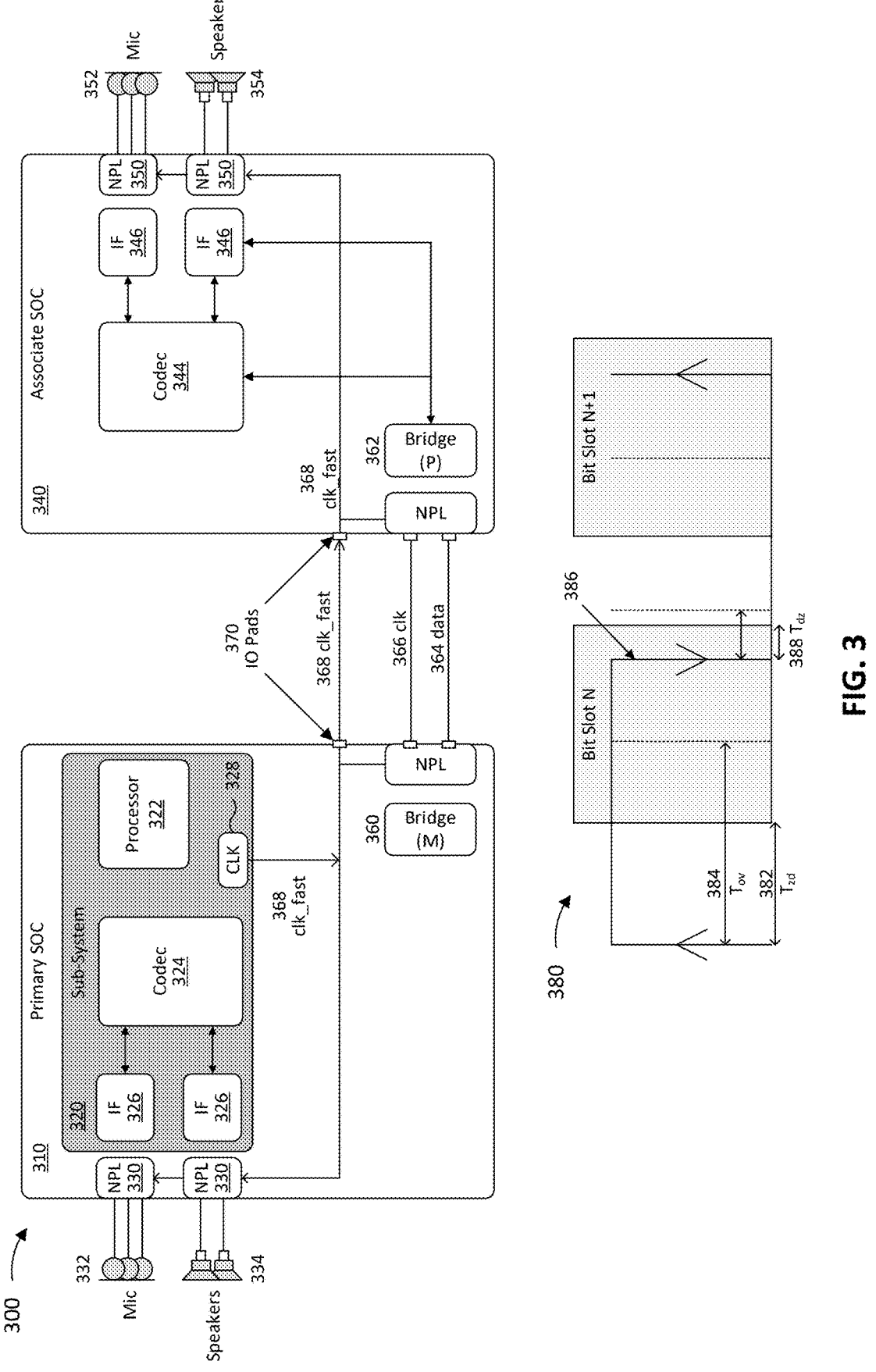
FIG. 3 is a diagram illustrating an example of a SoundWire bridge that may be used to transport peripheral data between SOCs in a multi-SOC electronic device, in accordance with the present disclosure.

FIG. 3 is a diagram illustrating an example 300 of a SoundWire bridge that may be used to transport peripheral data between SOCs in a multi-SOC electronic device, in accordance with the present disclosure. For example, as shown in FIG. 3, a multi-SOC electronic device may include a primary SOC 310, which includes a sub-system 320 to control one or more peripheral devices connected to the primary SOC 310. For example, as shown in FIG. 3, the sub-system 320 may include a processor 322 (e.g., an application processor), a codec 324, and one or more interfaces 326 to near-pad logic (NPL) ports 330 that connect to the one or more peripheral devices (e.g., one or more microphones 332 and one or more speakers 334 in FIG. 3, although the peripheral devices may include sensors or other suitable devices). In general, the sub-system may include a data bus (e.g., a SoundWire bus) to support communication between the processor 322, the codec 324, the interfaces 326, and the NPL ports 330 that connect to the one or more peripheral devices. In some aspects, as described herein, the data bus may be operated in accordance with standard protocols defined for interconnecting certain components of mobile devices, such as the SoundWire interface standards specified by the Mobile Industry Processor Interface (MIPI) Alliance. In particular, the primary SOC 310 may use the sub-system 320 to control the peripheral devices in accordance with one or more SoundWire standards, which define a multi-point, multi-wire interface that can be used to communicate information in frames, which may be transmitted over the interface using double data rate (DDR) clocking, a configurable frame size, and/or multiple channels. As described herein, SoundWire standards may define techniques for modulating digital audio data using pulse-density modulation.

As further shown in FIG. 3, the multi-SOC electronic device may include an associate SOC 340, which includes a codec 344 and one or more interfaces 346 to NPL ports 350 that connect to the one or more peripheral devices (e.g., one or more microphones 352 and one or more speakers 354).

However, to control the peripheral devices connected to the associate SOC 340, audio, control, and other peripheral data needs to be transported (or bridged) to the associate SOC 340 over an intermediate link. For example, FIG. 3 illustrates an example where the primary SOC 310 and the associate SOC 340 are connected by a SoundWire bridge that includes a master bridge 360 connected to an NPL port on the primary SOC 310 and a peripheral bridge 362 connected to an NPL port on the associate SOC 340. As shown in FIG. 3, the peripheral data is transported over the SoundWire bridge from the primary SOC 310 to the associate SOC 340 via a data line 364, and two clock lines used to time the interface digitally. For example, as shown in FIG. 3, the SoundWire bridge includes a first clock line between the NPL ports on the primary SOC 310 and the associate SOC 340 to carry a first clock signal 366, and the sub-system 320 of the primary SOC 310 includes a clock source or clock generator 328 that generates a second (faster) clock signal 368. For example, the second clock signal 368 may be synchronized with the first clock signal 366 and operated at two times the frequency of the first clock signal 366, or the second clock signal 368 may be unsynchronized with the first clock signal 366 and operated at a frequency of at least six times the frequency of the first clock signal 366.

For example, the second (faster) clock signal 368 may be needed to digitally time the interface between the primary SOC 310 and the associate SOC 340 because SoundWire is typically a DDR interface. For example, reference number 380 in FIG. 3 illustrates an example timing for a DDR interface operated using two clock signals. In particular, reference number 380 depicts a DDR clock in which one bit is transmitted per half-cycle, or two bits are transmitted per clock cycle, which imposes certain timing requirements with respect to when bits have to be placed on the data bus because there may be multiple devices or peripherals driving alternating bit slots. For example, in the example DDR clock timing shown in FIG. 3, a first bit is transmitted in bit slot N, which corresponds to a first half-cycle of the DDR clock (e.g., a falling or negative edge), and a second bit is transmitted in bit slot N+1, which corresponds to a second half-cycle of the DDR clock (e.g., a rising or positive edge). Accordingly, because there may be multiple devices or peripherals driving alternating bit slots (e.g., in bit slot N and bit slot N+1), there are various timing requirements to avoid contention between devices. For example, reference number 382 depicts a first timing requirement, $T_{zd}$, which is a minimum time to enable a data output signal after a clock edge (e.g., a rising or positive clock edge), and reference number 384 depicts a second timing requirement, $T_{ov}$, which is a time to a valid output signal after the clock edge. In other words, the first timing requirement, $T_{zd}$, and the second timing requirement, $T_{ov}$, define a time delay between the rising or positive edge to start driving the bit slot, and the data has to be held until a next (falling or negative) edge 386 to allow the associate SOC 340 to sample the data. As shown by reference number 388, another delay, $T_{dz}$, follows the sampling or capture edge 386, where $T_{dz}$ defines a time to disable the data output signal after the sampling or capture edge 386. Accordingly, one technique to handle the timing requirements of the DDR interface is to use the second (faster) clock signal 368 such that the data is placed on the data bus away from the clock edge (e.g., in the middle of a clock cycle). Alternatively, an analog delay component may be used, where a delay cell is inserted using an NPL design to time the interface. However, techniques that use the faster clock signal 368 pose challenges due to the availability of the faster clock signal 368 for both the primary SOC 310 and the associate SOC 340, where an additional I/O pad (or port) 370 is needed to transport the faster clock signal 368 to the associate SOC 340. Furthermore, transmitting the faster clock signal 368 to the associate SOC 340 introduces skew and other uncertainty. In addition, when using an analog NPL design, the delay may vary depending on the technology, which may result in significant corners that may pose challenges to satisfy timing requirements with delay-based cells.

Accordingly, as described herein, evolving audio systems in augmented reality, virtual reality, Internet of Things, and/or other applications often require multiple SOCs with audio interfaces that are connected through a SoundWire bridge. In an electronic device with multiple SOCs, the multiple SOCs typically include one primary SOC (e.g., primary SOC 310) that is connected to one or more associate SOCs (e.g., associate SOC 340) that behave as bridges to deliver audio, control, and/or other data to one or more endpoint peripherals, such as microphones 352, speakers 354, sensors, or the like. The primary SOC 310 is generally responsible for controlling the interface (e.g., the SoundWire bridge), the associate SOC(s) 340, and the endpoint peripherals 352, 354. However, challenges may arise because the associate SOC(s) 340 typically have a very low power consumption requirement and may not be equipped with a clock generator 328, instead relying on the clock signals 366, 368 transported over the SoundWire bridge, which is a DDR interface that requires a synchronous clock with a high frequency or an analog delay-based NPL design to operate without a clock source. In cases where an analog delay-based NPL design is used, the analog NPL is typically technology-dependent, which affects portability across different device types and results in a very large variation across process, voltage, and temperature (PVT) corners, thus introducing higher silicon costs and greater design complexity. Furthermore, using another faster clock 368 to connect the primary SOC 310 to the associate SOC 340 to avoid using an analog NPL design requires an additional I/O pad 370 on the primary SOC 310 and the associate SOC 340, which increases wiring and poses challenges for foldable electronic devices and other devices with form factors that impose physical wiring constraints. Furthermore, a DDR interface restricts the bandwidth and restricts the physical distance between the primary SOC 310 and the associate SOC 340. Accordingly, some aspects described herein relate to a SoundWire interface that has a single clock line, such that an SDR clock signal can be used to minimize the number of clock sources or I/O pads that are used to connect a primary SOC and an associate SOC, avoid a need for an analog NPL design to operate without a source clock, and/or enable a higher bandwidth and longer distance between the primary SOC and the associate SOC, among other examples.

As indicated above, FIG. 3 is provided as an example. Other examples may differ from what is described with respect to FIG. 3.

Figure 4:
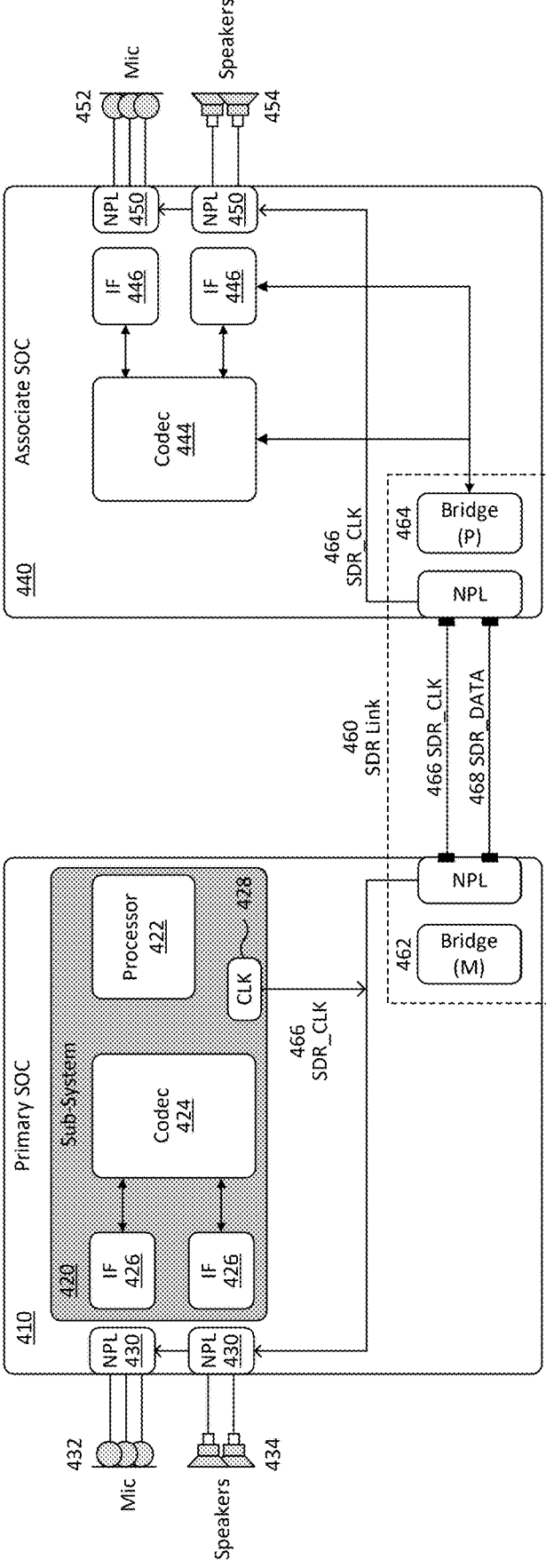

FIG. 4 is a diagram illustrating an example 400 associated with simplified clocking and I/O timing using an SDR link for a multi-SOC electronic device, in accordance with the present disclosure. As shown in FIG. 4, a multi-SOC electronic device may include a primary SOC 410 and an associate SOC 440, where the primary SOC 410 includes a sub-system 420 to control one or more peripheral devices connected to the primary SOC 410 and one or more peripheral devices connected to the associate SOC 440. For example, as shown in FIG. 4, the sub-system 420 may include a processor 422 (e.g., an application processor), a codec 424, and one or more interfaces 426 to NPL ports 430 that connect to the one or more peripheral devices (e.g., one or more microphones 432 and one or more speakers 434 in FIG. 4, although the peripheral devices may include sensors or other suitable devices). In general, the sub-system 420 may include a data bus (e.g., a SoundWire bus) to support communication between the processor 422, the codec 424, the interfaces 426, and the NPL ports 430 that connect to the one or more peripheral devices. In some aspects, as described herein, the data bus may be operated in accordance with standard protocols defined for interconnecting certain components of mobile devices, such as the SoundWire interface standards specified by the MIPI Alliance.

As further shown in FIG. 4, the associate SOC 440 may include a codec 444 and one or more interfaces 446 to NPL ports 450 that connect to the one or more peripheral devices (e.g., one or more microphones 452 and one or more speakers 454). In some aspects, to control the peripheral devices connected to the associate SOC 440, the primary SOC 410 may be configured to transport audio, control, and other peripheral data to the associate SOC 440 over an SDR link 460. For example, FIG. 4 illustrates an example where the SDR link 460 between the primary SOC 410 and the associate SOC 440 is a SoundWire bridge or a bridge that implements features associated with the SoundWire standard. For example, in some aspects, the SDR link 460 includes a master bridge 462 connected to an NPL port on the primary SOC 410 and a peripheral bridge 464 connected to an NPL port on the associate SOC 440. As shown in FIG. 4, the peripheral data is transported over the SoundWire bridge from the primary SOC 410 to the associate SOC 440 via a data bus 468 (e.g., according to a data signal, shown as SDR_DATA), and a single clock line that carries an SDR clock signal 466 to time the interface digitally. For example, as shown in FIG. 4, the SDR link 460 includes the single clock line between the NPL ports on the primary SOC 410 and the associate SOC 440 to carry the SDR clock signal 466 (shown as SDR_CLK), which may be generated by a clock source or clock generator 428 of the sub-system 420 of the primary SOC 410. In some aspects, edges of the SDR clock signal 466 may be used to time the interface between the primary SOC 410 and the associate SOC 440.

For example, in order to transport peripheral data to the associate SOC 440 over the SDR link 460 using the SDR clock signal 466, a device that has ownership of the data bus 468 (e.g., the master bridge 462) may drive the peripheral data onto the data bus 468 during one or more drive phases associated with the SDR clock signal 466, and the second SOC 440 may sample the peripheral data from the data bus 468 during one or more bus keeper phases associated with the SDR clock signal 466. For example, in some aspects, the peripheral data may be driven onto the data bus 468 starting at a rising edge or a positive edge of the SDR clock signal 466 (e.g., when the SDR clock signal 466 transitions from low to high), and the peripheral data may be sampled from the data bus 468 starting at a falling edge or a negative edge of the SDR clock signal 466 (e.g., when the SDR clock signal 466 transitions from high to low). In such cases, the drive phases associated with the SDR clock signal 466 may start when the SDR clock signal 466 transitions from low to high and may end when the SDR clock signal 466 transitions from high to low, and the bus keeper phases associated with the SDR clock signal 466 may start when the SDR clock signal 466 transitions from high to low and may end when the SDR clock signal 466 transitions from low to high. Alternatively, the peripheral data may be driven onto the data bus 468 starting at a falling edge or a negative edge of the SDR clock signal 466 (e.g., when the SDR clock signal 466 transitions from high to low), and the peripheral data may be sampled from the data bus 468 starting at a rising edge or a positive edge of the SDR clock signal 466 (e.g., when the SDR clock signal 466 transitions from low to high). In such cases, the drive phases associated with the SDR clock signal 466 may start when the SDR clock signal 466 transitions from high to low and may end when the SDR clock signal 466 transitions from low to high, and the bus keeper phases associated with the SDR clock signal 466 may start when the SDR clock signal 466 transitions from low to high and may end when the SDR clock signal 466 transitions from high to low.

In this way, using the SDR clock signal 466 to time the interface between the primary SOC 410 and the associate SOC 440 may enable a single clock line to be used to transport peripheral data from the primary SOC 410 to the associate SOC 440, which may reduce the number of wires that are used for the SDR link 460 (e.g., the single clock line occupies only one I/O pad on the primary SOC 410 and one I/O pad on the associate SOC 440, in contrast to two I/O pads on the primary SOC 410 and two I/O pads on the associate SOC 440 when two clock signals are used to time a SoundWire DDR interface). Furthermore, by using the digital SDR clock signal 466, the interface between the primary SOC 410 and the associate SOC 440 may be timed without using an analog delay-based NPL design, which may avoid variations across PVT corners, reduce silicon costs, and/or reduce design complexity. Furthermore, using a single SDR clock signal 466 mitigates various timing challenges, which may enable running the SDR clock signal 466 at a higher frequency (e.g., enabling a higher rate or bandwidth), extending the maximum distance between the primary SOC 410 and the associate SOC 440 by simplifying the I/O timing, and/or eliminating a need for a clock generator on the associate SOC 440. Furthermore, the single SDR clock signal 466 may maintain backward compatibility with existing SoundWire protocols.

As indicated above, FIG. 4 is provided as an example. Other examples may differ from what is described with respect to FIG. 4.

FIG. 5 is a diagram illustrating an example 500 associated with simplified clocking and I/O timing using an SDR link for a multi-SOC electronic device, in accordance with the present disclosure. In some aspects, reference number 510 depicts an example clock timing for an SDR clock signal, where a length of the SDR clock signal (e.g., from a first rising edge to a next rising edge, or a first falling edge to a next falling edge) is one bit slot. For example, when transporting peripheral data to an associate SOC over an SDR link using the SDR clock signal, a device that has ownership of a data bus (e.g., a SoundWire bridge) may drive the peripheral data onto the data bus during one or more drive phases associated with the SDR clock signal, and the second SOC may sample the peripheral data from the data bus during one or more bus keeper phases associated with the SDR clock signal.

For example, as shown in FIG. 5, the peripheral data may be driven onto the data bus starting at a launch edge 512, which is shown as a rising edge or a positive edge of the SDR clock signal (e.g., when the SDR clock signal transitions from low to high), and the peripheral data may be sampled from the data bus starting at a capture edge 516, which is shown as a falling edge or a negative edge of the SDR clock signal (e.g., when the SDR clock signal transitions from high to low). Alternatively, in some aspects, the launch edge 512 may be a falling edge or a negative edge of the SDR clock signal (e.g., when the SDR clock signal transitions from high to low), and the capture edge 516 may be a rising edge or a positive edge of the SDR clock signal (e.g., when the SDR clock signal transitions from low to high). In either case, as shown by reference number 514, the peripheral data may need to be placed on the data bus a threshold time, $T_{setup}$, prior to the capture edge 516, to ensure that the peripheral data is available to be sampled before the bus keeper phase starts with the capture edge 516. Furthermore, as shown by reference number 518, the peripheral data may be held on the data bus for at least a threshold time, $T_{hold}$, after to the capture edge 516, to ensure that the peripheral data is available to be sampled during the bus keeper phase. In this way, using the SDR clock signal allows both the bridge manager and the bridge peripheral(s) to operate on edges of the SDR clock signal, which results in deterministic I/O timing that may increase the maximum distance between the bridge manager and the bridge peripheral(s) and/or increase the maximum clock frequency (e.g., allowing a higher data rate or higher bandwidth).

For example, reference number 520 shows a sequence of alternating drive phases 528 and bus keeper phases 532, where peripheral data may be driven onto the data bus during the drive phases 528 and sampled from the data bus during the bus keeper phases 532. For example, FIG. 5 illustrates an example timing for the SDR clock signal 522 (shown as SDR_CLK) and an SDR data signal 524 (shown as SDR_DATA), where the SDR data signal 524 is used to drive peripheral data onto the data bus during the drive phases 528 and to hold the peripheral data on the data bus during the bus keeper phases 532. For example, in FIG. 5, the drive phases 528 begin with rising or positive edges 526 of the SDR clock signal 522, and the bus keeper phases 532 begin with falling or negative edges 530 of the SDR clock signal 522. Alternatively, in some aspects, the drive phases 528 may begin with falling or negative edges 530 of the SDR clock signal 522, and the bus keeper phases 532 may begin with rising or positive edges 530 of the SDR clock signal 522. Furthermore, as described herein, peripheral data may or may not be driven onto the data bus in any particular drive phase 528 (but peripheral data is driven onto the data bus only during drive phases 528).

As indicated above, FIG. 5 is provided as an example. Other examples may differ from what is described with respect to FIG. 5.

Figure 6:
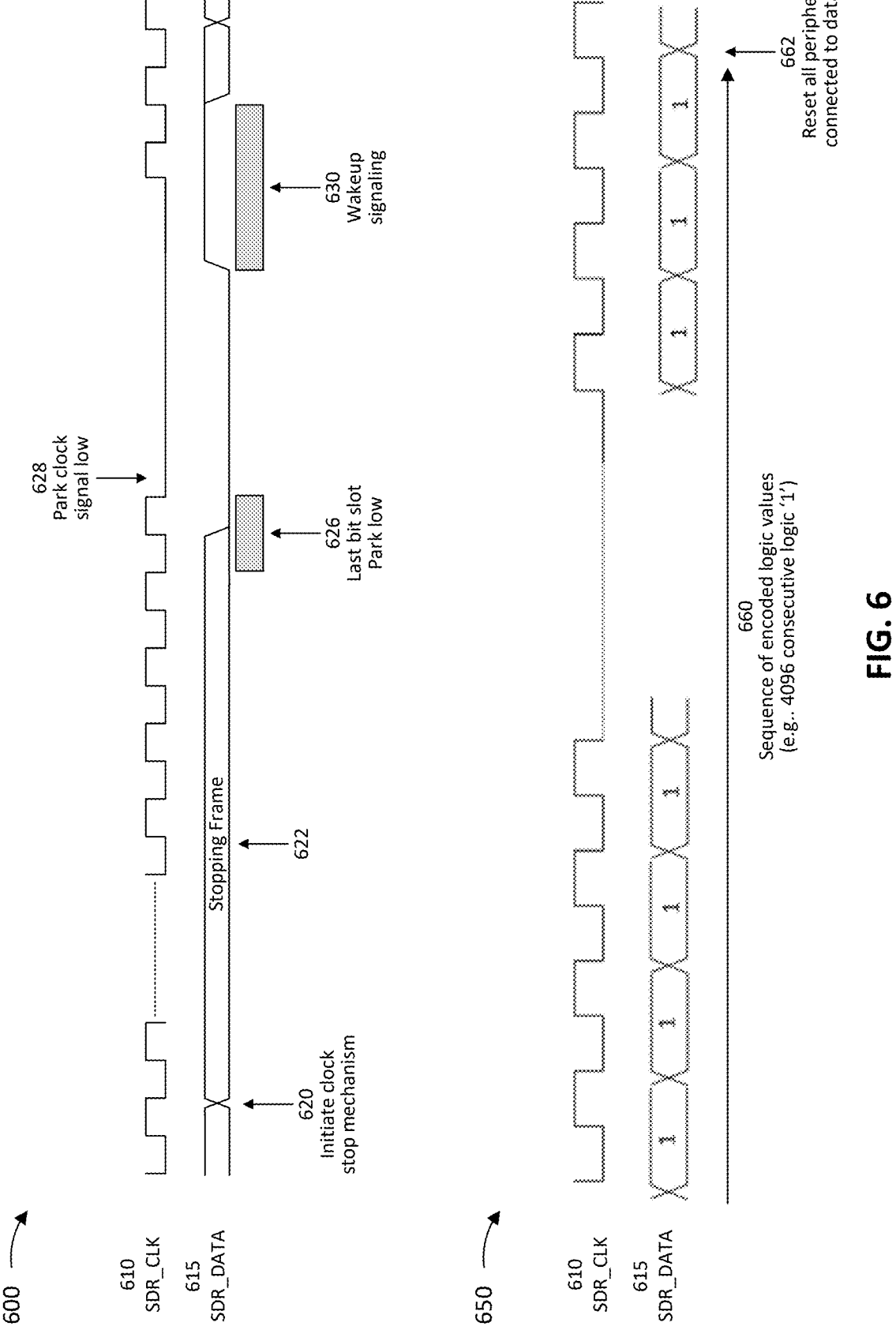
FIG. 6 is a diagram illustrating an example associated with a clock stop and wakeup mechanism and an example associated with a bus reset mechanism using an SDR link for a multi-SOC electronic device, in accordance with the present disclosure.

FIG. 6 is a diagram illustrating an example 600 associated with a clock stop and wakeup mechanism and an example 650 associated with a bus reset mechanism using an SDR link for a multi-SOC electronic device, in accordance with the present disclosure. For example, the clock stop and wakeup mechanism and the bus reset mechanism may each operate in accordance with an SDR clock signal 610 and an SDR data signal 615, as described in more detail elsewhere herein.

In some aspects, as described herein, the clock stop and wakeup mechanism shown by example 600 may be backward compatible with a SoundWire DDR mode, where the clock stop mechanism may be initiated when a logical "1" is written to a control register. As further shown in FIG. 6, the clock stop mechanism includes a stopping frame 622, which is a one-frame wind-down period, during which the SDR data signal 615 includes only logical "0"s. As shown by reference number 626, the SDR data signal 615 may be parked at a low signal level after a last bit slot of the stopping frame 622. Furthermore, as shown by reference number 628, the SDR clock signal 610 may be parked at a low signal level after the last bit slot of the stopping frame 622. In some aspects, a wakeup mechanism may then be enabled to resume the SDR clock signal 610 and the SDR data signal 615. For example, as shown by reference number 630, wakeup signaling may be triggered when a peripheral device sets the SDR data signal 615 to a high signal level. In some aspects, the previously sampled value may then be driven onto the data bus, without requiring any special logic.

In some aspects, as described herein, the bus reset mechanism shown by example 650 may also be backward compatible with a SoundWire DDR mode, where the bus reset mechanism may be used to reset registers associated with all SoundWire peripheral devices connected to the data bus responsive to detecting a sequence of logical values 660 on the data bus over a configured number of successive cycles of the SDR clock signal 610. For example, in some aspects, the sequence of logical values 660 may include 4096 successive bit slots in which the SDR data signal 615 includes encoded logical "1"s (e.g., 4096 clock cycles of alternating high/low on the data lane). As shown by reference number 662, registers associated with all peripheral devices connected to the data bus may be reset responsive to detecting the sequence of logical values on the data lane over the configured number of successive cycles of the SDR clock signal 610.

As indicated above, FIG. 6 is provided as an example. Other examples may differ from what is described with respect to FIG. 6.

FIG. 7 is a diagram illustrating an example process 700 performed, for example, at an electronic device or an apparatus of an electronic device, in accordance with the present disclosure. Example process 700 is an example where the apparatus or the electronic device performs operations associated with simplified clocking and I/O timing using an SDR link for multiple SOCs.

As shown in FIG. 7, in some aspects, process 700 may include generating peripheral data and an SDR clock signal to transport to a second SOC connected to the first SOC by a SoundWire bridge having a single clock line to carry the SDR clock signal (block 710). For example, the electronic device (e.g., using primary SOC 410, sub-system 420, processor 422, and/or clock source 428, depicted in FIG. 4, CPU(s) 802, depicted in FIG. 8, or the like) may generate peripheral data and an SDR clock signal to transport to a second SOC connected to the first SOC by a SoundWire bridge having a single clock line to carry the SDR clock signal, as described above.

As further shown in FIG. 7, in some aspects, process 700 may include transporting the peripheral data to the second SOC over the SoundWire bridge according to the SDR clock signal carried on the single clock line (block 720). For example, the electronic device (e.g., using SDR link 460, depicted in FIG. 4, system bus 808, depicted in FIG. 8, or the like) may transport the peripheral data to the second SOC over the SoundWire bridge according to the SDR clock signal carried on the single clock line, as described above.

As further shown in FIG. 7, in some aspects, transporting the peripheral data to the second SOC over the SoundWire bridge includes driving, by the first SOC, the peripheral data onto a data bus during one or more drive phases associated with the SDR clock signal (block 730). For example, the electronic device (e.g., using primary SOC 410, sub-system 420, SDR link 460, master bridge 462, SDR clock signal 466, and/or data bus 468, depicted in FIG. 4, CPU(s) 802, depicted in FIG. 8, or the like) may drive, by the first SOC, the peripheral data onto a data bus during one or more drive phases associated with the SDR clock signal, as described above.

As further shown in FIG. 7, in some aspects, transporting the peripheral data to the second SOC over the SoundWire bridge includes sampling, by the second SOC, the peripheral data from the data bus during one or more bus keeper phases associated with the SDR clock signal (block 740). For example, the electronic device (e.g., using associate SOC 440, SDR link 460, peripheral bridge 464, SDR clock signal 466, and/or data bus 468, depicted in FIG. 4, CPU(s) 802, depicted in FIG. 8, or the like) may sample, by the second SOC, the peripheral data from the data bus during one or more bus keeper phases associated with the SDR clock signal, as described above.

Process 700 may include additional aspects, such as any single aspect or any combination of aspects described below and/or in connection with one or more other processes described elsewhere herein.

In a first aspect, the one or more drive phases start at rising edges when the SDR clock signal transitions from low to high, and the one or more bus keeper phases start at falling edges when the SDR clock signal transitions from high to low.

In a second aspect, alone or in combination with the first aspect, the one or more drive phases start at falling edges when the SDR clock signal transitions from high to low, and the one or more bus keeper phases start at rising edges when the SDR clock signal transitions from low to high.

In a third aspect, alone or in combination with one or more of the first and second aspects, the single clock line occupies one I/O pad on the first SOC and one I/O pad on the second SOC.

In a fourth aspect, alone or in combination with one or more of the first through third aspects, process 700 includes writing a value to a register to initiate a clock stop mechanism that parks the SDR clock signal and a data signal at a low level after a stopping frame.

In a fifth aspect, alone or in combination with one or more of the first through fourth aspects, process 700 includes detecting, while the SDR clock signal and a data signal are parked at a low level, wakeup signaling that transitions the data signal to a high level, and restarting the SDR clock signal responsive to detecting the wakeup signaling.

In a sixth aspect, alone or in combination with one or more of the first through fifth aspects, process 700 includes resetting registers associated with all peripheral devices connected to the data bus responsive to detecting a sequence of logical values on the data bus over a configured number of successive cycles of the SDR clock signal.

In a seventh aspect, alone or in combination with one or more of the first through sixth aspects, process 700 includes delivering, by the second SOC, the peripheral data transported over the SoundWire bridge to one or more peripheral devices connected to the second SOC.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
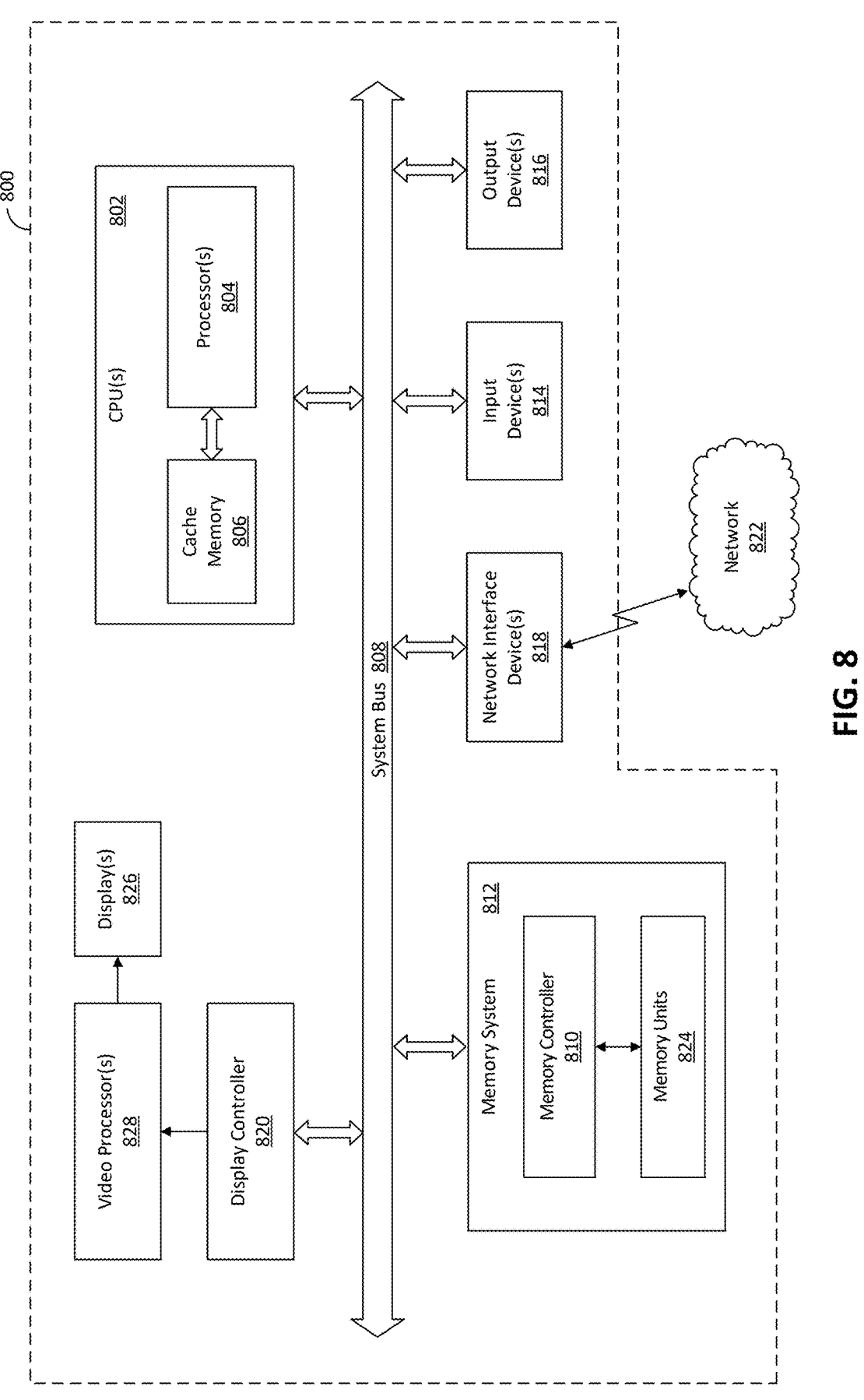
FIG. 8 is a diagram of an example processor-based system that can support simplified clocking and I/O timing using an SDR link for a multi-SOC electronic device, in accordance with the present disclosure.

FIG. 8 is a diagram of an example processor-based system 800 that can support simplified clocking and I/O timing using an SDR link for a multi-SOC electronic device, in accordance with the present disclosure. For example, techniques described herein to provide simplified clocking and I/O timing using an SDR link for a multi-SOC electronic device may be provided in or integrated into any processor-based device, such as a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, and/or augmented reality glasses or a virtual reality headset, among other examples), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, and/or a foldable device.

Accordingly, FIG. 8 illustrates an exemplary processor-based system 800 that can support the techniques described herein to provide simplified clocking and I/O timing using an SDR link for a multi-SOC electronic device. For example, as shown in FIG. 8, the processor-based system 800 may include one or more central processing units (CPUs) 802, where each CPU 802 may include one or more processors 804. The CPU(s) 802 may have cache memory 806 coupled to the processor(s) 804 for rapid access to temporarily stored data. In some aspects, the CPU(s) 802 may be coupled to a system bus 808. For example, in some aspects, the CPU(s) 802 may include a first SOC and a second SOC, and the system bus 808 may include a Sound-Wire bridge and/or SDR link connecting the first SOC and the second SOC. In some aspects, the CPU(s) 802 may communicate with other devices by exchanging address, control, and data information (e.g., audio, control, or other peripheral data) over the system bus 808. Although not explicitly illustrated in FIG. 8, multiple system buses 808 may be provided, wherein each system bus 808 constitutes a different fabric.

In some aspects, other master and slave devices can be connected to the system bus 808. As shown in FIG. 8, the other master and slave devices can include a memory system 812, one or more input devices 814 (e.g., one or more microphones), one or more output devices 816 (e.g., one or more speakers), one or more network interface devices 818, and/or one or more display controllers 820, among other examples. The input device(s) 814 can include any type of input device, including input keys, switches, and/or voice processors, among other examples. The output device(s) 816 can include any type of output device, including audio, video, and/or other visual indicators, among other examples. In some aspects, the network interface device(s) 818 can be any device configured to allow exchange of data to and from a network 822. The network 822 can be any type of network, including, but not limited to, a wired or wireless network, a private or public network, a local area network (LAN), a wireless local area network (WLAN), a wide area network (WAN), a personal area network (PAN), or the Internet. The network interface device(s) 818 can be configured to support any type of communications protocol desired. The memory system 812 can include one or more memory units 824 and a memory controller 810.

The CPU(s) 802 may also be configured to access the display controller(s) 820 over the system bus 808 to control information sent to one or more displays 826. The display controller(s) 820 may send information to the display(s) 826 to be displayed via one or more video processors 828, which may process the information to be displayed into a format suitable for the display(s) 826. The display(s) 826 can include any type of display, including, but not limited to, a cathode ray tube (CRT), a liquid crystal display (LCD), a plasma display, and/or a light emitting diode (LED) display.

In some aspects, the processor-based system 800 may implement one or more techniques or perform one or more operations associated with simplified clocking and I/O timing using an SDR link for a multi-SOC device, as described in more detail elsewhere herein. For example, the CPU(s) 802, the memory system 812, the display controller 820, and/or any other component(s) of FIG. 4 or FIG. 8 may perform or direct operations of, for example, process 700 of FIG. 7 or other processes as described herein (alone or in conjunction with one or more other components). The memory units 824 may store data and program codes for the processor-based system 800. In some examples, the memory units 824 may include a non-transitory computer-readable medium storing a set of instructions (for example, code or program code) for implementing one or more techniques or performing one or more operations associated with simplified clocking and I/O timing using an SDR link for a multi-SOC device. The memory units 824 may include one or more memories, such as a single memory or multiple different memories (of the same type or of different types). The memory units 824 may include one or more memories, such as a single memory or multiple different memories (of the same type or of different types). For example, the set of instructions, when executed (for example, directly, or after compiling, converting, or interpreting) by one or more processors of an electronic device, may cause the electronic device to perform process 700 of FIG. 7 or other processes as described herein. In some examples, executing instructions may include running the instructions, converting the instructions, compiling the instructions, and/or interpreting the instructions, among other examples.

In some aspects, an electronic device includes means for generating peripheral data and an SDR clock signal to transport over a SoundWire bridge having a single clock line; and/or means for transporting the peripheral data over the SoundWire bridge according to the SDR clock signal carried on the single clock line, wherein the means for transporting the peripheral data over the SoundWire bridge may include means for driving the peripheral data onto a data bus during one or more drive phases associated with the SDR clock signal; and/or means for sampling the peripheral data from the data bus during one or more bus keeper phases associated with the SDR clock signal. In some aspects, the means for the electronic device to perform operations described herein may include, for example, one or more of primary SOC 410, sub-system 420, processor 422, codec 424, interface 426, NPL 430, microphone(s) 432, speaker(s) 434, associate SOC 440, codec 444, interface 446, NPL 450, microphone(s) 452, speaker(s) 454, SDR link 460, master bridge 462, peripheral bridge 464, SDR clock signal 466, data bus 468, CPU(s) 802, processor(s) 804, cache memory 806, system bus 808, memory controller 810, memory system 812, memory units 824, input device(s) 814, output device(s) 816, display controller 820, display(s) 826, and/or video processor(s) 828, among other examples.

The following provides an overview of some Aspects of the present disclosure:

Aspect 1: A method performed by an electronic device, comprising: generating, by a first SOC, peripheral data and an SDR clock signal to transport to a second SOC connected to the first SOC by a SoundWire bridge having a single clock line to carry the SDR clock signal; and transporting the peripheral data to the second SOC over the SoundWire bridge according to the SDR clock signal carried on the single clock line, wherein transporting the peripheral data to the second SOC over the SoundWire bridge includes: driving, by the first SOC, the peripheral data onto a data bus during one or more drive phases associated with the SDR clock signal; and sampling, by the second SOC, the peripheral data from the data bus during one or more bus keeper phases associated with the SDR clock signal.

Aspect 2: The method of Aspect 1, wherein the one or more drive phases start at rising edges when the SDR clock signal transitions from low to high, and the one or more bus keeper phases start at falling edges when the SDR clock signal transitions from high to low.

Aspect 3: The method of any of Aspects 1-2, wherein the one or more drive phases start at falling edges when the SDR clock signal transitions from high to low, and the one or more bus keeper phases start at rising edges when the SDR clock signal transitions from low to high.

Aspect 4: The method of any of Aspects 1-3, wherein the single clock line occupies one I/O pad on the first SOC and one I/O pad on the second SOC.

Aspect 5: The method of any of Aspects 1-4, further comprising: writing a value to a register to initiate a clock stop mechanism that parks the SDR clock signal and a data signal at a low level after a stopping frame.

Aspect 6: The method of any of Aspects 1-5, further comprising: detecting, while the SDR clock signal and a data signal are parked at a low level, wakeup signaling that transitions the data signal to a high level; and restarting the SDR clock signal responsive to detecting the wakeup signaling.

Aspect 7: The method of any of Aspects 1-6, further comprising: resetting registers associated with all peripheral devices connected to the data bus responsive to detecting a sequence of logical values on the data bus over a configured number of successive cycles of the SDR clock signal.

Aspect 8: The method of any of Aspects 1-7, further comprising: delivering, by the second SOC, the peripheral data transported over the SoundWire bridge to one or more peripheral devices connected to the second SOC.

Aspect 9: An electronic device, comprising: a first SOC; a second SOC; and a SoundWire bridge connecting the first SOC to the second SOC, wherein the SoundWire bridge has a single clock line, wherein: the first SOC is configured to generate peripheral data and an SDR clock signal to transport to the second SOC, the first SOC is configured to drive the peripheral data onto a data bus during one or more drive phases associated with the SDR clock signal, and the second SOC is configured to sample the peripheral data from the data bus during one or more bus keeper phases associated with the SDR clock signal.

Aspect 10: The electronic device of Aspect 9, wherein the one or more drive phases start at rising edges when the SDR clock signal transitions from low to high, and the one or more bus keeper phases start at falling edges when the SDR clock signal transitions from high to low.

Aspect 11: The electronic device of any of Aspects 9-10, wherein the one or more drive phases start at falling edges when the SDR clock signal transitions from high to low, and the one or more bus keeper phases start at rising edges when the SDR clock signal transitions from low to high.

Aspect 12: The electronic device of any of Aspects 9-11, wherein the single clock line occupies one I/O pad on the first SOC and one I/O pad on the second SOC.

Aspect 13: The electronic device of any of Aspects 9-12, further comprising one or more controllers configured to: write a value to a register to initiate a clock stop mechanism that parks the SDR clock signal and a data signal at a low level after a stopping frame.

Aspect 14: The electronic device of any of Aspects 9-13, further comprising one or more controllers configured to: detect, while the SDR clock signal and a data signal are parked at a low level, wakeup signaling that transitions the data signal to a high level; and restart the SDR clock signal responsive to detecting the wakeup signaling.

Aspect 15: The electronic device of any of Aspects 9-14, further comprising one or more controllers configured to: reset registers associated with all peripheral devices connected to the data bus responsive to detecting a sequence of logical values on the data bus over a configured number of successive cycles of the SDR clock signal.

Aspect 16: The electronic device of any of Aspects 9-15, where the second SOC is further configured to: deliver the peripheral data transported over the SoundWire bridge to one or more peripheral devices connected to the second SOC.

Aspect 17: An apparatus for wireless communication, comprising: means for generating peripheral data and an SDR clock signal to transport over a SoundWire bridge having a single clock line; and means for transporting the peripheral data over the SoundWire bridge according to the SDR clock signal carried on the single clock line, wherein the means for transporting the peripheral data over the SoundWire bridge includes: means for driving the peripheral data onto a data bus during one or more drive phases associated with the SDR clock signal; and means for sampling the peripheral data from the data bus during one or more bus keeper phases associated with the SDR clock signal.

Aspect 18: The apparatus of Aspect 17, wherein the one or more drive phases start at rising edges when the SDR clock signal transitions from low to high, and the one or more bus keeper phases start at falling edges when the SDR clock signal transitions from high to low.

Aspect 19: The apparatus of any of Aspects 17-18, wherein the one or more drive phases start at falling edges when the SDR clock signal transitions from high to low, and the one or more bus keeper phases start at rising edges when the SDR clock signal transitions from low to high.

Aspect 20: The apparatus of any of Aspects 17-19, wherein the single clock line occupies one I/O pad on the first SOC and one I/O pad on the second SOC.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A method performed by an electronic device, comprising:

generating, by a first system-on-chip (SOC), peripheral data and a single data rate (SDR) clock signal to transport to a second SOC connected to the first SOC by a SoundWire bridge having a single clock line to carry the SDR clock signal; and transporting the peripheral data to the second SOC over the SoundWire bridge according to the SDR clock signal carried on the single clock line, wherein transporting the peripheral data to the second SOC over the SoundWire bridge includes:

driving, by the first SOC, the peripheral data onto a data bus during one or more drive phases associated with the SDR clock signal; and sampling, by the second SOC, the peripheral data from the data bus during one or more bus keeper phases associated with the SDR clock signal.

2. The method of claim 1, wherein the one or more drive phases start at rising edges when the SDR clock signal transitions from low to high, and the one or more bus keeper phases start at falling edges when the SDR clock signal transitions from high to low.

3. The method of claim 1, wherein the one or more drive phases start at falling edges when the SDR clock signal transitions from high to low, and the one or more bus keeper phases start at rising edges when the SDR clock signal transitions from low to high.

4. The method of claim 1, wherein the single clock line occupies one input/output (I/O) pad on the first SOC and one I/O pad on the second SOC.

5. The method of claim 1, further comprising:

writing a value to a register to initiate a clock stop mechanism that parks the SDR clock signal and a data signal at a low level after a stopping frame.

6. The method of claim 1, further comprising:

detecting, while the SDR clock signal and a data signal are parked at a low level, wakeup signaling that transitions the data signal to a high level; and restarting the SDR clock signal responsive to detecting the wakeup signaling.

7. The method of claim 1, further comprising:

resetting registers associated with all peripheral devices connected to the data bus responsive to detecting a sequence of logical values on the data bus over a configured number of successive cycles of the SDR clock signal.

8. The method of claim 1, further comprising:

delivering, by the second SOC, the peripheral data transported over the SoundWire bridge to one or more peripheral devices connected to the second SOC.

9. An electronic device, comprising:

a first system-on-chip (SOC);

a second SOC; and a SoundWire bridge connecting the first SOC to the second SOC, wherein the SoundWire bridge has a single clock line, wherein:

the first SOC is configured to generate peripheral data and a single data rate (SDR) clock signal to transport to the second SOC, the first SOC is configured to drive the peripheral data onto a data bus during one or more drive phases associated with the SDR clock signal, and the second SOC is configured to sample the peripheral data from the data bus during one or more bus keeper phases associated with the SDR clock signal.

10. The electronic device of claim 9, wherein the one or more drive phases start at rising edges when the SDR clock signal transitions from low to high, and the one or more bus keeper phases start at falling edges when the SDR clock signal transitions from high to low.

11. The electronic device of claim 9, wherein the one or more drive phases start at falling edges when the SDR clock signal transitions from high to low, and the one or more bus keeper phases start at rising edges when the SDR clock signal transitions from low to high.

12. The electronic device of claim 9, wherein the single clock line occupies one input/output (I/O) pad on the first SOC and one I/O pad on the second SOC.

13. The electronic device of claim 9, further comprising one or more controllers configured to:

write a value to a register to initiate a clock stop mechanism that parks the SDR clock signal and a data signal at a low level after a stopping frame.

14. The electronic device of claim 9, further comprising one or more controllers configured to:

detect, while the SDR clock signal and a data signal are parked at a low level, wakeup signaling that transitions the data signal to a high level; and restart the SDR clock signal responsive to detecting the wakeup signaling.

15. The electronic device of claim 9, further comprising one or more controllers configured to:

reset registers associated with all peripheral devices connected to the data bus responsive to detecting a sequence of logical values on the data bus over a configured number of successive cycles of the SDR clock signal.

16. The electronic device of claim 9, where the second SOC is further configured to:

deliver the peripheral data transported over the Sound-Wire bridge to one or more peripheral devices connected to the second SOC.

17. An apparatus, comprising:

means for generating peripheral data and a single data rate (SDR) clock signal to transport over a SoundWire bridge having a single clock line; and means for transporting the peripheral data over the Sound-Wire bridge according to the SDR clock signal carried on the single clock line, wherein the means for transporting the peripheral data over the SoundWire bridge includes:

means for driving the peripheral data onto a data bus during one or more drive phases associated with the SDR clock signal; and means for sampling the peripheral data from the data bus during one or more bus keeper phases associated with the SDR clock signal.

18. The apparatus of claim 17, wherein the one or more drive phases start at rising edges when the SDR clock signal transitions from low to high, and the one or more bus keeper phases start at falling edges when the SDR clock signal transitions from high to low.

19. The apparatus of claim 17, wherein the one or more drive phases start at falling edges when the SDR clock signal transitions from high to low, and the one or more bus keeper phases start at rising edges when the SDR clock signal transitions from low to high.

20. The apparatus of claim 17, wherein the single clock line occupies one input/output (I/O) pad on a first system-on-chip (SOC) and one I/O pad on a second SOC that are connected via the SoundWire bridge.

* * * * *